G. P. GREGORY.
GAGE.
APPLICATION FILED APR. 14, 1917.

1,278,910.

Patented Sept. 17, 1918.
2 SHEETS—SHEET 1.

Inventor:
George P. Gregory,
by Robt. P. Harris.
Attorney.

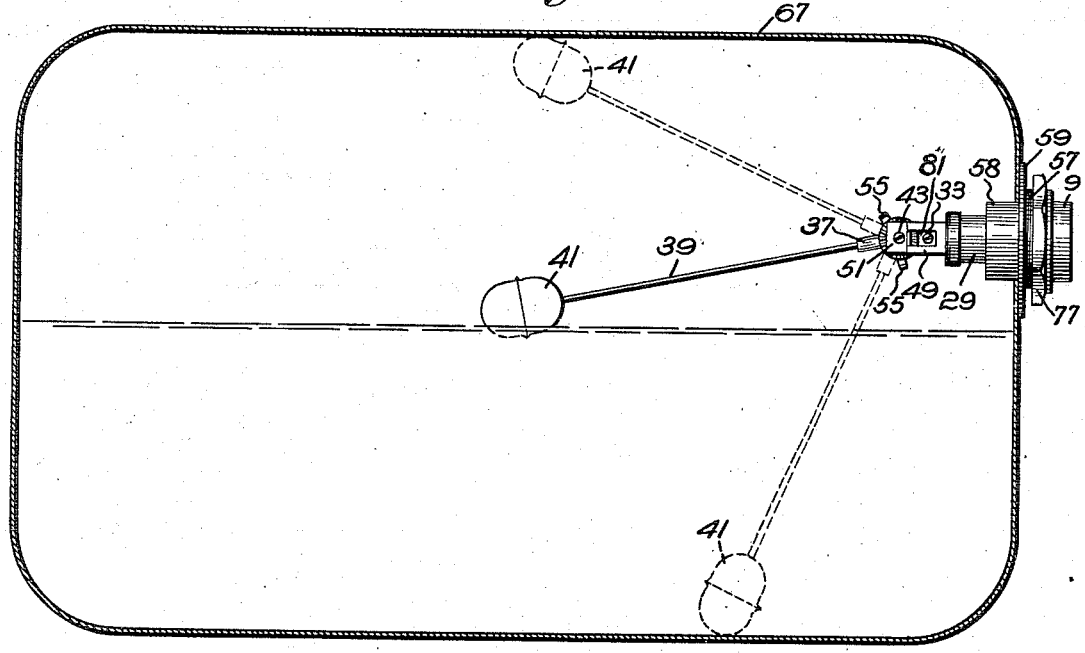
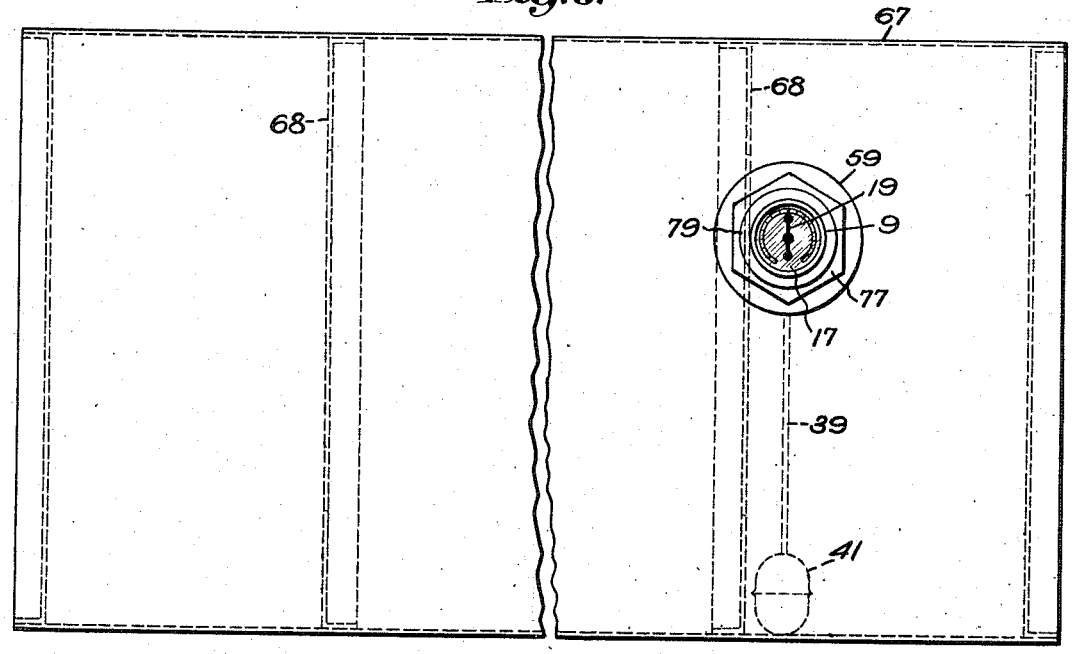

UNITED STATES PATENT OFFICE.

GEORGE P. GREGORY, OF BOSTON, MASSACHUSETTS, ASSIGNOR TO BOSTON AUTO GAGE COMPANY, OF BOSTON, MASSACHUSETTS, A CORPORATION OF MASSACHUSETTS.

GAGE.

1,278,910.

Specification of Letters Patent.  Patented Sept. 17, 1918.

Application filed April 14, 1917. Serial No. 162,040.

*To all whom it may concern:*

Be it known that I, GEORGE P. GREGORY, a citizen of the United States, residing at Boston, county of Suffolk, and State of Massachusetts, have invented an Improvement in Gages, of which the following description, in connection with the accompanying drawings, is a specification, like characters on the drawings representing like parts.

The invention hereinafter described relates to gages for measuring the depth of liquids, and is an improvement upon the gage shown in Letters Patent No. 1,141,499, granted to C. W. Stahle, June 1, 1915.

A valuable use for the gage is for indicating the level of the gasolene in tanks for automobiles. Heretofore considerable difficulty has been experienced in applying the gage to the tank and securing the same thereon in the appropriate position for locating the float of the gage in its proper working position. This was due among other reasons to the fact that these tanks are closed and when applying the gage thereto, the float of the gage is concealed from view, so that it is impossible to readily determine the working position thereof with respect to the tank. One of the objects of the invention is to provide a gage having simple and effective means for determining the appropriate mounting of the gage to secure proper operation of the float.

Another object is to provide a receiver or socket for the head of the gage whereby said head may be securely connected to the tank.

Another object is to provide means for facilitating insertion of said head into and the removal of the same from said receiver.

And still another object is to provide means connecting the float with the head of the gage so as to insure accurate rocking of said float relatively to said head.

The character of the invention may be best understood by reference to the following description of one good form of the invention shown in the accompanying drawing, wherein:—

Fig. 5 is a vertical section through a gasolene tank having the gage mounted thereon; and Fig. 6 is a front elevation of the tank and gage shown in Fig. 5.

Figure 1:
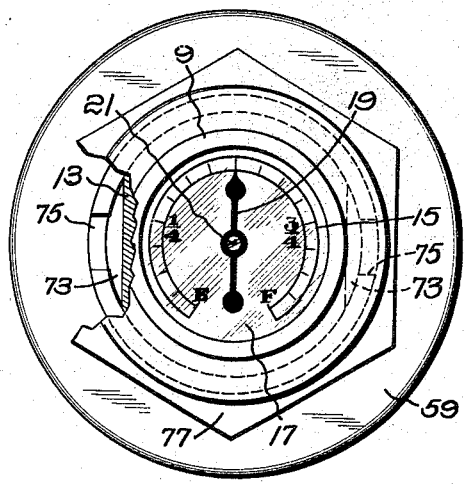
Figure 1 is a front elevation of the gage shown herein as embodying the invention.
Figure 2:
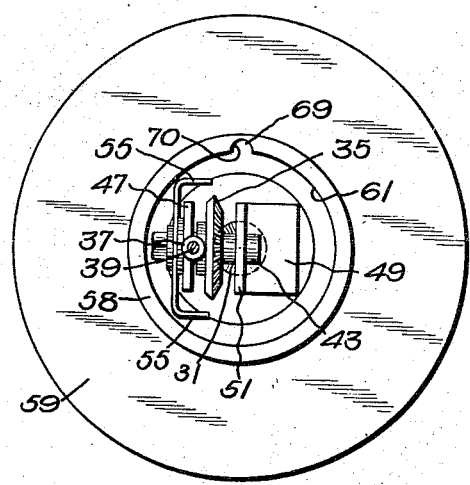
Fig. 2 is a rear elevation of the gage.
Figure 3:
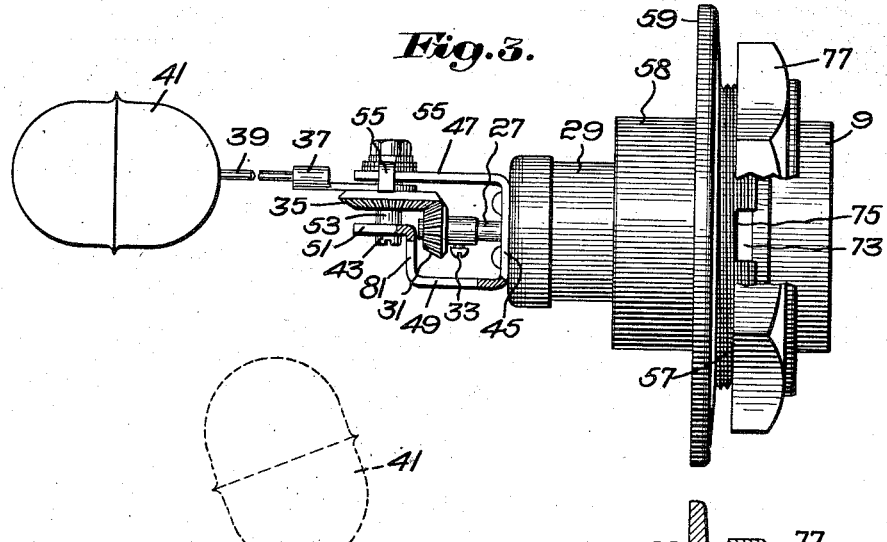
Fig. 3 is a plan of the gage partially broken away to disclose internal parts thereof.

Referring to the drawing, the gage shown therein as embodying the invention comprises a head 7 (Figs. 1 to 4) of brass or other suitable material having a forwardly projecting neck 9, a rearwardly projecting neck 11 and a circumferential flange 13 intermediate said necks. A dial 15 having a series of graduations and characters thereon for measuring the depth of the liquid is suitably secured in said head and protected by a glass 17. To indicate the level of the liquid an index 19 is mounted in said head between said dial and glass on a pin 21 secured in said head.

To move said needle over said dial, in the present instance of the invention, said needle is magnetic and coöperates with a magnet such as shown in the patent referred to, mounted on one end of a shaft 27 journaled in bearings in the opposite ends of a tube 29 threaded or otherwise secured to the neck at the rear end of said head.

To rotate said shaft it is extended somewhat beyond the rear end of said tube and has a beveled pinion 31 secured thereon by a screw 33 entered through the hub of said pinion. To rotate said pinion, a beveled gear 35 is provided having one end of an arm 37 secured thereto, the opposite end of said arm being secured to a rod 39 carrying a float 41.

Heretofore considerable difficulty has been experienced from the tendency of said gear to wabble and work loose on its shaft, thereby interfering with the efficient transmission of movement from the float to the index. Next will be described simple and effective means for overcoming these objections. To this end the gear is mounted on a stud shaft 43 conveniently in the form of a bolt. To support this bolt a bracket 45 is secured to the rear end of the tube 29 referred to and comprises a pair of opposed members 47 and 49 projecting outward from said tube. One of said members may be bent inward to present a portion 51 closely adjacent the other member. The stud shaft extends through registering holes in said portion and the member opposite thereto, the construction being such that the stud shaft is positively supported closely adjacent the opposite faces of the gear and thus wabbling of the gear or movement thereof out of proper alinement in prevented and said gear is reliably supported in position appropriately to mesh with the beveled pinion referred to.

To contribute to the positioning of said gear, spacing sleeves 53 may be mounted on said stud shaft between the opposite faces of said gear and the members in which the stud shaft is supported.

To limit the swinging movement of the float, adjustable stop arms 55 may be mounted on said stud shaft and may be confined between the outer face of one of the members of said bracket and the nut of the bolt shaft. These stop arms are bent inward so as to be engaged by the float arm after the latter has rocked a predetermined extent.

Next will be described the means whereby the gage may be located in position to insure the proper operation of the float. In the present instance of the invention this means comprises a sustaining member or socket 57 having a rearward projecting neck 58, and a collar 59 adapted to be soldered or otherwise secured to the wall of the gasolene tank or other support. This socket has a central bore 61 formed to receive and fit the neck 11 on the rear end of the head. The socket has a recess 63 of an internal diameter corresponding to the diameter of the circumferential flange 13 of said head. The difference in the diameter of the bore and the recess is such that a substantial circumferential shoulder 65 is provided for limiting movement of the head inward into said socket. A washer 66 may be interposed between said flange and shoulder to prevent leakage.

In Figs. 5 and 6 the gage head is shown mounted on a side wall of a tank 67 having usual baffle walls 68 therein. The float is positioned to rock in a substantially vertical plane closely adjacent to one of said baffle walls. To mount the gage on the tank, first the socket is secured to the wall of the tank, and then the float, its rod and arm, the gear supporting bracket and the tube projecting rearward from the head are inserted as a unit through the socket into the interior of the tank. The head 7 is then inserted into said socket until its flange 13 is limited by the circumferential shoulder 65 of said socket.

When the parts are in this relation it is impossible to see the position of the float in the interior of the tank, and therefore, it is difficult to determine the correct rotative adjustment of the head with respect to said socket in order to locate the float so that it will operate in the substantially vertical plane referred to and avoid striking said baffle wall.

To enable the correct rotative adjustment of the head to be quickly made, a tongue or projection 69 may be formed on the neck 11 of the head at a point on the periphery of said neck in the plane of the rocking movement of said float and the socket is provided with a groove or depression 70 located at the top of the socket.

The construction is such that the head may be presented to said socket and quickly adjusted to cause said tongue to enter said groove, thereby locating the head in the appropriate position to insure the movement of the float in a substantially vertical plane.

The tongue and groove described not only serve to determine the correct rotative adjustment of the head with respect to the socket, but also to lock the head against the rotative movement in said socket.

The fit between the head and the recess of the socket is such that air pocketed between the same may tend to retard or prevent the insertion of the head into said recess and the suction between them may tend to prevent removal of the head from said recess. To facilitate removal of the head from said recess, the circumferential flange of the head may be provided with opposed grooves 73 in its periphery presenting shoulders which may be engaged by a suitable tool to force the head from said socket. Openings or notches 75 may be provided in said socket opposite said grooves to admit the tool thereto. These notches may also desirably serve to facilitate escape of air from the socket when the head is inserted therein and to admit air to said socket when the head is being removed therefrom.

To secure the head in said socket and press the rear end of the circumferential flange thereof toward the circumferential shoulder 65 of said socket, and confine the packing washer between them a cap 77 may be threaded to said socket and have an internal flange 79 for engagement with the circumferential flange 13 of said head. The periphery of this cap may be slabbed off to enable the application of a wrench thereto.

By the construction described the gage head may be very quickly inserted into the socket in the correct position to insure the movement of the float in its proper plane, and if desired the head may be quickly and readily removed from said socket to furnish access to the float and the transmission devices operated thereby for purposes of inspection or repair thereof as desired.

Figure 4:
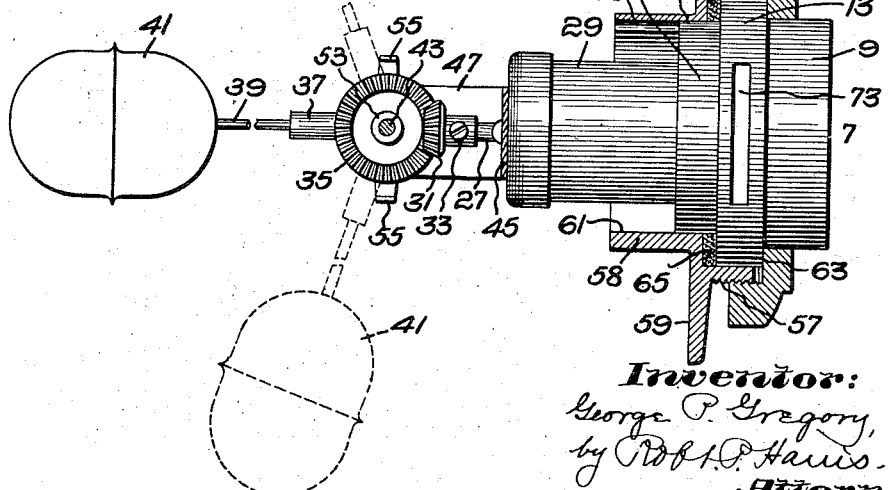
Fig. 4 is a view partly in side elevation and vertical section showing the relation of the head of the gage with its socket when assembled.

In assembling the parts of the gage the index shaft should be rotatively adjusted to cause the index to point to the letter "E" on the dial when the tank is empty and the float is in the lowest position as represented by dotted lines in Figs. 4 and 5. To permit the outer end of the shaft to be grasped by pincers or other suitable tool to effect this adjustment without interference, from the stud shaft or bracket, the latter may have an aperture 81 (Figs. 3 and 5) therein through which the tool may be inserted. After the shaft is turned to the correct position the screw 33 of the pinion 31 is tightened to secure the latter to said shaft and correct indication of the float positions will be assured.

The gage is strong and simple in construction, cheap to manufacture and is not likely to get out of order.

It will be understood that the invention is not limited to the specific embodiment shown and described therein, but that extensive deviations may be made therefrom, without departing from the spirit and scope of the appended claims.

Claims:

1. In a gage for liquids, the combination with a head, of a dial therein, an index cooperating with said dial, means including a float for actuating said index; and a sustaining member for said head, said member and head having a projection on one and a depression in the other for determining the relation of said head to said member for securing the proper operating position for said float.

2. In a gage for liquids, the combination with a head, of a dial therein, an index cooperating with said dial, means including a float for actuating said index; and a sustaining socket for receiving said head, said head and socket having a projection on one and a depression in the other for determining the relation of said head to said socket for securing the proper operating position for said float.

3. In a gage for liquids, the combination with a head, of a dial therein, an index cooperating with said dial, means for actuating said index including a float movable in a substantially vertical plane; and a sustaining member for said head, said member and head having means for determining the position of said head to secure operation of said float in said plane.

4. In a gage for liquids, the combination with a head, of a dial therein, an index cooperating with said dial, means including a float for actuating said index; a sustaining socket for said head, said socket and head having means for determining the proper rotative adjustment of said head to locate said float in its proper operating position.

5. In a gage for liquids, the combination with a head, of a dial therein, an index cooperating with said dial, means including a float for actuating said index; a sustaining socket for said head having a recess for engagement with said head to limit movement of the latter inward in said socket, and means on said head and socket for determining the rotative adjustment of the former relative to the latter to locate said float in its proper operating position.

6. In a gage for liquids, the combination with a head, of a dial therein, an index cooperating with said dial, means including a float for actuating said index; a sustaining socket for receiving said head, and means to permit passage of air to and from the socket to facilitate insertion of said head in and removal of the same from said socket.

7. In a gage for liquids, the combination with a head, of a dial therein, an index cooperating with said dial, means including a float for actuating said index; a sustaining socket for receiving said head, said head having a shoulder adapted to be engaged by a tool for removing said head from said socket, and said socket having an opening therein for admitting the tool to said shoulder.

8. In a gage for liquids, the combination with a head, of a dial therein, an index cooperating with said dial, means including a float for actuating said index; a socket having a recess therein for receiving said head, the latter having shoulders adapted to be engaged by a tool to remove the head from said socket, and notches in said socket opposed to said shoulders for admitting the tool to the latter.

9. In a gage for liquids, the combination with a head, of a dial therein, an index cooperating with said dial, a tube connected to said head, a bracket on said tube having opposed members projecting outward from said tube and presenting end portions in closely adjacent opposed relation, a stud secured to said portions of said members, a float, and an arm having one end connected to said float and its opposite end connected to said stud.

10. In a gage for liquids, the combination with a head, of a dial therein, an index cooperating with said dial, a tube connected to said head, a bracket secured to said tube and having opposed members projecting outward from said tube, a short stud connecting said members, a float, an arm extending from said float to said stud, means including gears for actuating said index from said float, and stops secured to one of the members of said bracket for limiting the movement of said float arm.

11. In a gage for liquids, the combination with a head, of a dial therein, an index cooperating with said dial, a support connected to said head, a bracket secured to said support having opposed closely disposed bearing members, a shaft journaled in said support, a pinion on an end of said shaft, a short stud on said members extending transversely to said shaft adjacent said pinion, a gear on said stud meshing with said pinion, a float, and an arm therefor, said bracket having an aperture permitting access to the end of said shaft for assembly adjustment thereof.

In testimony whereof, I have signed my name to this specification.

GEORGE P. GREGORY.